United States Patent
Kim et al.

(10) Patent No.: US 9,910,305 B2
(45) Date of Patent: Mar. 6, 2018

(54) METHOD FOR MANUFACTURING A LIQUID CRYSTAL DISPLAY BY APPLYING A LASER TO REMOVE AT LEAST A PORTION OF A POLYMER THIN FILM LAYER AND A SUBSTRATE

(71) Applicant: Samsung Display Co., Ltd, Yongin-si, Gyeonggi-do (KR)

(72) Inventors: Myung Hwan Kim, Yongin-si (KR); Myeong Hee Kim, Yongin-si (KR); Dae Ho Lee, Seoul (KR); Hee-Keun Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 84 days.

(21) Appl. No.: 15/059,123

(22) Filed: Mar. 2, 2016

(65) Prior Publication Data

US 2016/0320654 A1  Nov. 3, 2016

(30) Foreign Application Priority Data

Apr. 30, 2015 (KR) .................. 10-2015-0061608

(51) Int. Cl.
*G02F 1/1333* (2006.01)
*G02F 1/1335* (2006.01)

(52) U.S. Cl.
CPC ...... *G02F 1/133305* (2013.01); *G02F 1/1333* (2013.01); *G02F 1/133377* (2013.01); *G02F 1/133528* (2013.01); *Y02P 20/582* (2015.11)

(58) Field of Classification Search
CPC .............. G02F 1/1362; G02F 1/13371; G02F 1/133377; H01L 27/1296
See application file for complete search history.

(56) References Cited

U.S. PATENT DOCUMENTS

| | | | |
|---|---|---|---|
| 7,081,765 B2 | 7/2006 | Miyasaka et al. | |
| 8,455,872 B2 | 6/2013 | French | |
| 2007/0164290 A1* | 7/2007 | Yamazaki | G02F 1/13454 257/72 |
| 2009/0047859 A1 | 2/2009 | Kim et al. | |
| 2010/0210055 A1 | 8/2010 | Yoon et al. | |

(Continued)

FOREIGN PATENT DOCUMENTS

| | | |
|---|---|---|
| JP | 06-258629 | 9/1994 |
| JP | 06-334204 A | 12/1994 |

(Continued)

*Primary Examiner* — Paul Lee
(74) *Attorney, Agent, or Firm* — Innovation Counsel LLP (57) ABSTRACT

A method for manufacturing a liquid crystal display according to an exemplary embodiment of the present invention includes: forming a polymer thin film layer on a substrate; forming a thin film transistor (TFT) substrate on the polymer thin film layer; forming a thin film transistor array on the thin film transistor substrate; forming an upper polarizing plate on the thin film transistor substrate on which the thin film transistor array is formed; applying a laser to the polymer thin film layer to remove a portion of the polymer thin film layer and the substrate; attaching an adhesive layer onto a rear surface of the polymer thin film layer from which the substrate is separated; and attaching the polymer thin film layer onto which the adhesive layer is attached and a lower polarizing plate together.

12 Claims, 12 Drawing Sheets

(56) References Cited

U.S. PATENT DOCUMENTS

| | | | | |
|---|---|---|---|---|
| 2012/0231566 A1* | 9/2012 | Oh | ............ | G02F 1/1333 |
| | | | | 438/27 |
| 2013/0020731 A1* | 1/2013 | Kim | ............ | G02F 1/133305 |
| | | | | 264/1.37 |
| 2013/0264572 A1* | 10/2013 | Lee | ............ | H01L 27/124 |
| | | | | 257/59 |
| 2014/0232962 A1* | 8/2014 | Ishida | ............ | H01L 25/167 |
| | | | | 349/42 |

FOREIGN PATENT DOCUMENTS

| | | |
|---|---|---|
| JP | 07-325297 | 12/1995 |
| JP | 2002-033464 A | 1/2002 |
| JP | 2002-328360 A | 11/2002 |
| KR | 10-2013-0056038 A | 5/2013 |
| KR | 10-2014-0062368 A | 5/2013 |
| KR | 10-2013-0117112 A | 10/2013 |
| KR | 10-2014-0085954 A | 7/2014 |

* cited by examiner

METHOD FOR MANUFACTURING A LIQUID CRYSTAL DISPLAY BY APPLYING A LASER TO REMOVE AT LEAST A PORTION OF A POLYMER THIN FILM LAYER AND A SUBSTRATE

CROSS-REFERENCE TO RELATED APPLICATION

This application claims priority to and the benefit of Korean Patent Application No. 10-2015-0061608 filed in the Korean Intellectual Property Office on Apr. 30, 2015, the entire contents of which are incorporated herein by reference.

BACKGROUND (a) Technical Field

The present invention relates to a liquid crystal display and a method for manufacturing the same.

(b) Description of the Related Art

Currently, as a widely known display device, there are various display devices such as a liquid crystal display (LCD), a plasma display panel (PDP), an organic light emitting diode (OLED) display, a field effect display (FED), and an electrophoretic display device. Presently, research relating to a technology for forming the aforementioned various display devices using a flexible material are being actively performed. If the display device made of flexible material is introduced, the display device may be applied to novel fields such as electronic books and electronic paper, which may further increase a use range of the display device.

In order to form structures of the display device on a substrate made of the flexible material used in the flexible display device, the substrate needs to be fixed. In order to secure the substrate made of the flexible material, a method for attaching the flexible substrate onto a carrier substrate made of a rigid material is used. After a process for manufacturing a display substrate is finished, the completed display substrate and the carrier substrate are separated.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal display of which the flexibility is secured, a manufacturing process is simplified, and a cost is reduced, and a method for manufacturing the same.

An exemplary embodiment of the present invention provides a method for manufacturing a liquid crystal display, the method including: forming a polymer thin film layer on a substrate; forming a thin film transistor (TFT) substrate on the polymer thin film layer; forming a thin film transistor array on the thin film transistor substrate; forming an upper polarizing plate on the thin film transistor substrate on which the thin film transistor array is formed; applying a laser to the polymer thin film layer to remove at least a portion of the polymer thin film layer and the substrate; attaching an adhesive layer onto a rear surface of the polymer thin film layer from which the substrate is separated; and attaching the polymer thin film layer onto which the adhesive layer is attached and a lower polarizing plate together.

A thickness of the polymer thin film layer remaining after partial removal by the laser may be 0.1 micrometer (um) to 1 um.

The polymer thin film layer may include opaque polyimide, polyamide, polycarbonate, or polyethylene terephthalate, or a combination thereof.

The laser having an energy density of 200 mJ/cm$^2$ to 300 mJ/cm$^2$ may be radiated to remove the polymer thin film layer.

The method may further include: forming a barrier layer between the polymer thin film layer and the thin film transistor substrate.

The barrier layer may include one or more of silicon nitride (SiNx), silicon oxide (SiOx), aluminum oxide ($Al_2O_3$), silicon oxynitride, aluminum nitride, and aluminum oxynitride.

The barrier layer may be formed of a monolayer or a multi-layer.

The method may further include: forming an encapsulation layer positioned between the thin film transistor substrate and the upper polarizing plate and covering an upper surface and an edge of the thin film transistor substrate.

The encapsulation layer may be formed of a monolayer or a multi-layer.

A glass transition temperature Tg of the lower polarizing plate may be lower than a glass transition temperature of the polymer thin film layer.

The laser may be applied to the polymer thin film layer to completely remove the polymer thin film layer.

The method for manufacturing a liquid crystal display according to the exemplary embodiment of the present invention may further include: forming a pixel electrode connected to one terminal of the thin film transistor; forming a sacrificial layer on the pixel electrode; forming a roof layer on the sacrificial layer; removing the sacrificial layer to form a plurality of microcavities; and injecting a liquid crystal material into the microcavity to form a liquid crystal layer.

Another exemplary embodiment of the present invention provides a liquid crystal display including: a lower polarizing plate; a polymer thin film layer positioned on the lower polarizing plate; a transistor positioned on the polymer thin film layer; a pixel electrode connected to one terminal of the transistor; a roof layer positioned to face the pixel electrode; a microcavity having a liquid crystal injection hole formed between the pixel electrode and the roof layer and forming a liquid crystal layer including a liquid crystal molecule; an encapsulation layer formed on the roof layer to cover the injection hole and encapsulating the microcavity; and an upper polarizing plate positioned on the encapsulation layer, in which a thickness of the polymer thin film layer is 0.1 um to 1 um.

The polymer thin film layer may include opaque polyimide, polyamide, or polyethylene terephthalate, or a combination thereof.

The liquid crystal display according to the exemplary embodiment of the present invention may not include the polymer thin film layer.

According to the exemplary embodiments of the present invention, there is provided a method for manufacturing a liquid crystal display having flexibility and transparency by laminating an ultra-thin film polymer material on a substrate and removing all or a portion of the polymer material.

Further, there are merits in that since a low-priced material is applied and the substrate is reused, cost can be reduced and a process can be simplified.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 1:
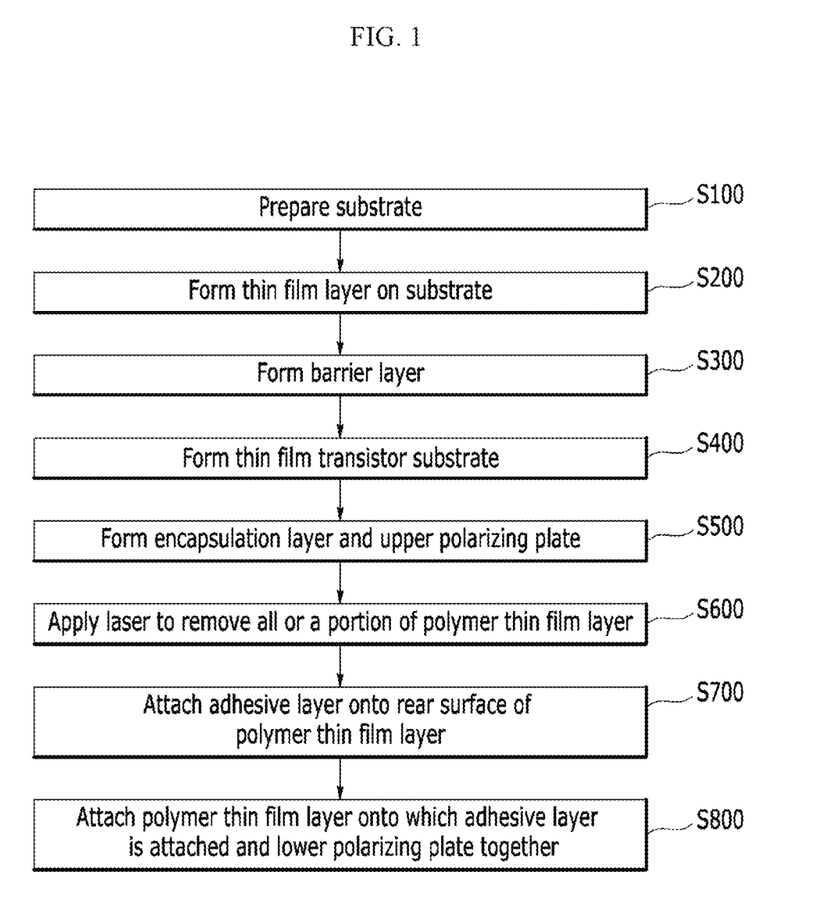
FIG. 1 is a flowchart sequentially illustrating a method for manufacturing a liquid crystal display according to an exemplary embodiment of the present invention.

FIG. 1 is a flowchart sequentially illustrating a method for manufacturing a liquid crystal display according to an exemplary embodiment of the present invention, and FIGS. 2 to 8 are views each schematically illustrating a process for manufacturing a liquid crystal display according to the exemplary embodiment of the present invention.

Hereinafter, the method for manufacturing a liquid crystal display according to the exemplary embodiment of the present invention will be described with reference to FIGS. 1 to 8. The method for manufacturing a liquid crystal display according to the exemplary embodiment of the present invention includes, as illustrated in FIG. 1, preparing a substrate 110 (S100), forming a polymer thin film layer 120 (S200), forming a barrier layer 130 (S300), forming a thin film transistor substrate 140 (S400), forming an encapsulation layer 150 and an upper polarizing plate 160 (S500), removing all or a portion of the polymer thin film layer 120 (S600), attaching an adhesive layer 115 onto a rear surface of the polymer thin film layer 120 (S700), and attaching the polymer thin film layer 120 and a lower polarizing plate 105 together (S800).

Figure 2:
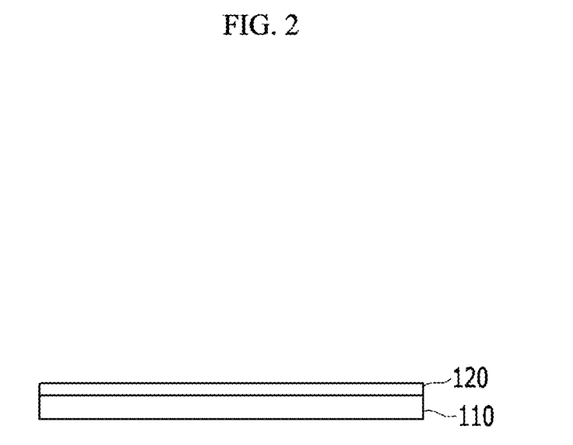
FIGS. 2, 3, 4, 5, 6, 7, and 8 are views each schematically illustrating a process for manufacturing a liquid crystal display according to the exemplary embodiment of the present invention.

As illustrated in FIG. 2, a step of preparing the substrate 110 is a step of preparing a carrier substrate 110 fixing a display device while the process for manufacturing a liquid crystal display according to the exemplary embodiment of the present invention is performed (S100).

In detail, the substrate 110 may be formed of glass, metal, ceramic, or the like, or may be formed of a flexible film made from an organic material such as a resin.

In a step of forming the polymer thin film layer 120, the polymer thin film layer 120 is formed so that an opaque polymer material is thinly and uniformly applied on the substrate 110 by using a coating process such as spin coating, spray coating, slit coating, and inkjet coating (S200). In this case, a thickness of the polymer thin film layer 120 formed on the substrate is about 2 nanometers (nm) to about 1,000 nm.

In detail, the polymer thin film layer 120 is an opaque polymer material capable of being decomposed by a laser, and may be a material where laser ablation is feasible at a wavelength of 308 nm. In more detail, the polymer thin film layer 120 may include one or more of polyimide, polyamide, polycarbonate, and polyethylene terephthalate.

Figure 3:
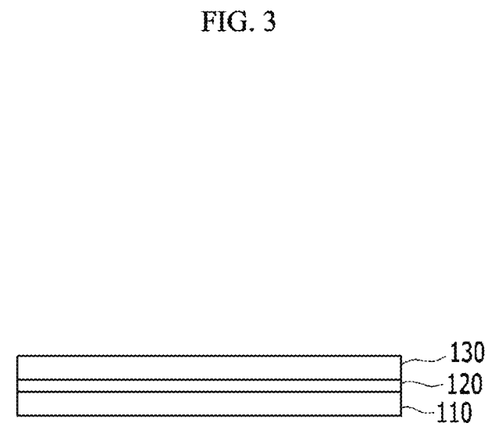

As illustrated in FIG. 3, a barrier layer 130 serving as an impact resistance layer is formed on the polymer thin film layer 120 (S300). Unlike a glass substrate, since moisture and oxygen, which may cause degradation of image characteristics of a liquid crystal display, easily penetrate an organic material substrate such as a resin, the organic material substrate may be designed in a structure for preventing penetration thereof. For example, the organic material substrate may be formed in a laminate structure, where the barrier layer 130 which may be formed of an inorganic material layer having a monolayer or a multi-layer structure or an organic/inorganic complex multi-layer, is formed on a resin layer.

Although not illustrated in FIG. 3, in order to protect the barrier layer 130, a coating layer (overcoat layer) formed of a transparent polymer layer or the like may be formed on the barrier layer 130. In detail, in the case where the barrier layer 130 is formed of an organic material layer, for example, a flash evaporation technology comprising coating the organic material under vacuum and curing the organic material may be used. In the case where the barrier layer is formed of an inorganic layer, the barrier layer may be formed by depositing SiOx, SiNx, or the like using a technology such as a plasma enhanced chemical vapor deposition (PECVD) method, an atmospheric pressure chemical vapor deposition CVD (APCVD) method, and a low pressure CVD (LPCVD) method.

As described above, in the case where the substrate 110 is formed of a rigid material such as glass, a step of forming the barrier layer 130 may be omitted.

Figure 4:
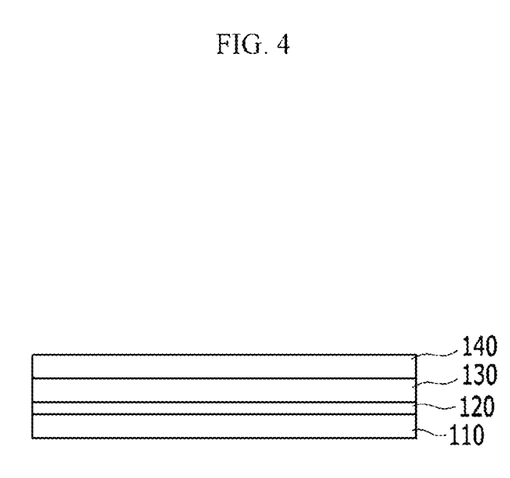

Thereafter, as illustrated in FIG. 4, on the barrier layer 130, a thin film transistor (TFT) substrate 140 is formed on an entire surface of the liquid crystal display (S400).

In this case, the thin film transistor substrate 140 may be made from heat-resistant polyimide or polyamide in order to manufacture the liquid crystal display, and in this case, is formed on the substrate 110 by the same method as the aforementioned method of applying the material of the polymer thin film layer 120. In detail, a thin film transistor array (not illustrated) and a liquid crystal layer (not illustrated) are formed on the thin film transistor substrate 140.

The thin film transistor array includes a gate line, a data line, a thin film transistor adjacent to a cross portion thereof, and a pixel electrode formed in a pixel region provided in a cross structure thereof.

Figure 5:
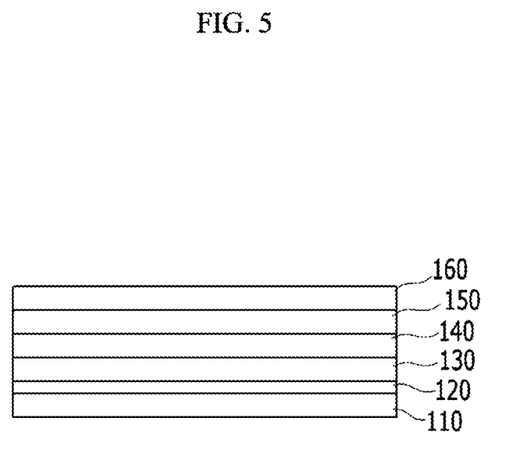

Next, a step of forming the encapsulation layer 150 and the upper polarizing plate 160 will be described with reference to FIG. 5 (S500).

The encapsulation layer 150 is formed at an upper side of the thin film transistor substrate 140 to protect a TFT array, a liquid crystal layer, and the like from oxygen, moisture, and the like. In detail, the encapsulation layer 150 is positioned to face the substrate 110, and prevents inflow of oxygen and moisture from the outside. In the encapsulation layer 150, one or more organic layers or one or more inorganic layers may be sequentially laminated or alternately laminated.

In more detail, in the case where the encapsulation layer 150 is formed of an organic layer, the encapsulation layer 150 is formed of a polymer and may be a monolayer any one selected from or any combination elected from polyethylene terephthalate (PET), polyimide (PI), polycarbonate (PC), epoxy, polyethylene (PE), and polyacrylate (PA).

On the other hand, in the case where the encapsulation layer 150 is formed of an inorganic layer, the inorganic layer may be a monolayer or a multi-layer including metal oxide or metal nitride. Specifically, the inorganic layer may include any one of SiNx, $Al_2O_3$, $SiO_2$, $TiO_2$, and any combination thereof.

The encapsulation layer 150 is a layer having a small thickness, and is easily damaged by stabbing or scratching by contaminants generated during external scraping or while the process is performed. This appears as defects such as dark points on a screen of the liquid crystal display. In order to prevent damage to the encapsulation layer 150, the upper polarizing plate 160 may be attached onto the encapsulation layer 150 (S500).

The upper polarizing plate 160 converts an optical axis of light emitted to the outside of the liquid crystal display to improve visibility of the liquid crystal display. Generally, the polarizing plate has a structure where a transparent passivation film is laminated on both surfaces or one surface of a polarizer formed of a polyvinyl alcohol-based resin. The upper polarizing plate 160 of the liquid crystal display according to the present exemplary embodiment is fixed to the encapsulation layer 150 and the thin film transistor substrate 140 while completely encapsulating the encapsulation layer 150 from the above. However, the upper polarizing plate 160 is not limited thereto, and polarizing plates having various structures may be used. In the exemplary embodiment of the present invention, the upper polarizing plate 160 may be formed to further include a phase compensation layer compensating for a phase difference Rth in a thickness direction and/or a phase compensation layer compensating for a front surface phase difference Ro.

The barrier layer 130, the thin film transistor substrate 140, the encapsulation layer 150, and the upper polarizing plate 160 of the present exemplary embodiment, which are described above, serve to control a fracture impact wave (anti-fracture) in a step of detaching the polymer thin film layer 120 and the substrate, which will be performed later.

Figure 6:
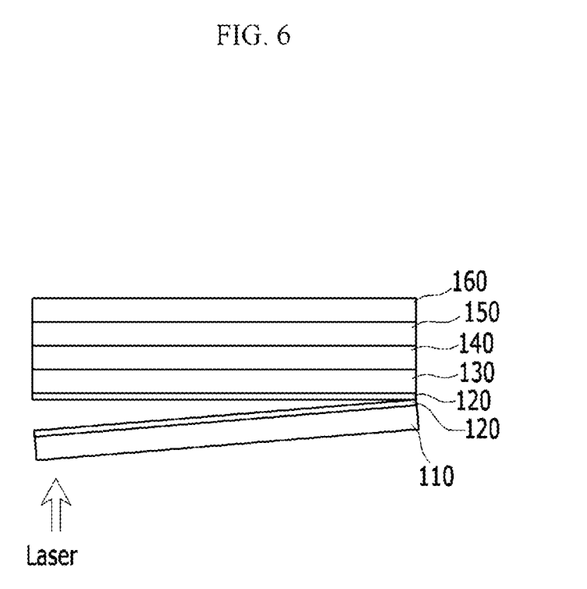

A step of adding the laser to remove all or a portion of the polymer thin film layer 120 will be described with reference to FIG. 6. FIG. 6 illustrates that a portion of the polymer thin film layer 120 and the substrate 110 are separated from each other by applying the laser to the polymer thin film layer 120 according to the present exemplary embodiment (S600).

In the exemplary embodiment of the present invention, as the laser, laser equipment such as an excimer laser and a solid-state laser may be used, but the laser is not limited thereto.

Preferably, in the exemplary embodiment of the present invention, the laser having an energy density of 200 $mJ/cm^2$ to 300 $mJ/cm^2$ is radiated to remove all or a portion of the polymer thin film layer 120. More preferably, the laser having the energy density of 300 $mJ/cm^2$ with an error range of 10 $mJ/cm^2$ may be radiated.

Figure 9:
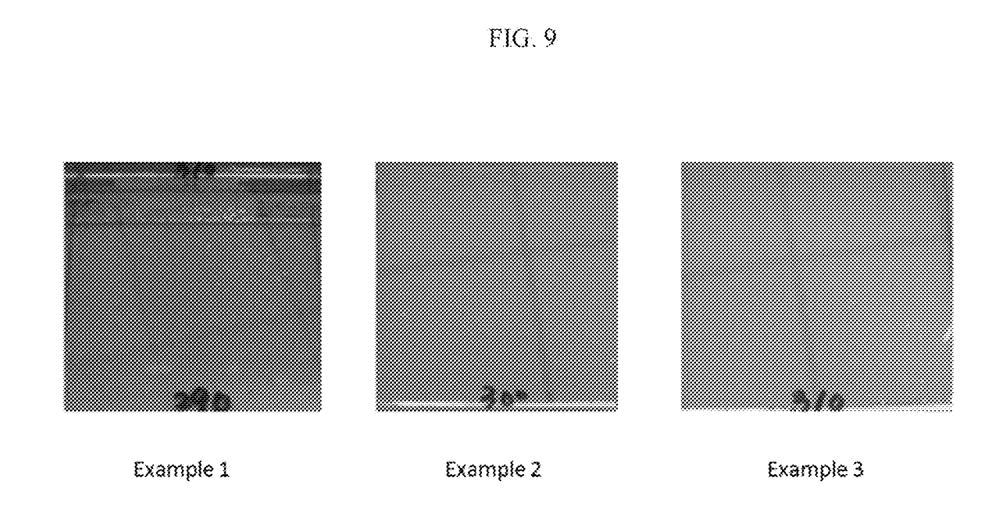
FIG. 9 is a picture of a thin film panel formed by the process for manufacturing a liquid crystal display according to the exemplary embodiment of the present invention.

FIG. 9 provides a picture of a thin film panel formed by the process for manufacturing a liquid crystal display according to the exemplary embodiment of the present invention.

FIG. 9 provides a picture of the thin film layer in the case where the polymer thin film layer 120 is removed by the excimer laser (overlap 50%) having the energy density of 290 $mJ/cm^2$ (Example 1), 300 $mJ/cm^2$ (Example 2), and 310 $mJ/cm^2$ (Example 3).

In FIG. 9, it can be confirmed that in all cases of Examples 1 to 3, the polymer thin film layer is totally detached without non-detaching defects.

Further, as confirmed in FIG. 9, in the case where the polymer thin film layer 120 is removed to result in a thickness of 0.1 um to 1 um, due to the polymer thin film layer 120 of the ultra-thin film, the liquid crystal display having flexibility and transparency may be secured.

As illustrated in FIG. 6, since the polymer thin film layer 120 can be removed by the laser and detached from the substrate 110, the substrate 110 can be reused, and thus there is an effect of reducing cost required in the process. In the exemplary embodiment of the present invention, there is a benefit in that the polymer thin film layer 120, which is attached onto the substrate 110 and removed by the excimer laser and the like, can be reused by only a simple washing operation.

Moreover, in the exemplary embodiment of the present invention, in the case where the polymer thin film layer 120 is completely removed, unlike a liquid crystal display having flexibility in the related art, since the liquid crystal display not including the substrate can be manufactured, material cost may be reduced, and an ultra-thin film substrate having flexibility and transparency may be formed.

Figure 7:
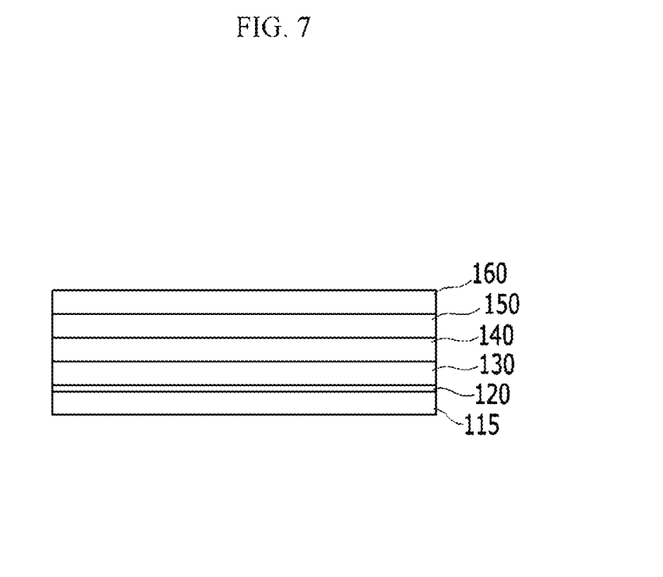

Referring to FIGS. 1 and 7, the adhesive layer 115 is attached onto a rear surface of the polymer thin film layer 120 partially removed by the laser (S700). Thereafter, the adhesive layer 115 is disposed between the polymer thin film layer 120 and the lower polarizing plate 105, and this is configured to fix the lower polarizing plate 105 to the polymer thin film layer 120.

The adhesive layer 115, for example, may be formed by applying an adhesive material, or may be an adhesive tape. In the present exemplary embodiment, the adhesive layer 115 may be formed of a silicone material.

Figure 8:
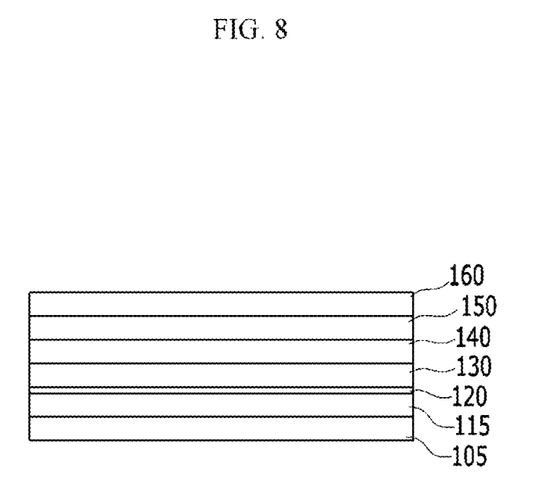

Thereafter, referring to FIGS. 1 and 8, the polymer thin film layer 120 onto which the adhesive layer 115 is attached and the lower polarizing plate 105 are laminated together (S800). The lower polarizing plate 105 may have the same structure and be formed of the same material as the upper polarizing plate 160, and in detail, may include a polarization element generating polarization and a tri-acetyl-cellulose (TAC) layer for securing durability. Further, according to some exemplary embodiments, directions of transmissive axes of the upper polarizing plate 160 and the lower polarizing plate 105 may be perpendicular or parallel to each other.

In the present exemplary embodiment, a glass transition temperature Tg of the lower polarizing plate 105 is lower than a glass transition temperature Tg of the polymer thin film layer 120. Thereby, while the lower polarizing plate 105 is formed, the polymer thin film layer 120 having a higher heat-resistant temperature may not be affected.

Then, the liquid crystal display according to the exemplary embodiment of the present invention will be described in detail with reference to the manufacturing process of FIGS. 1 to 8.

Figure 10:
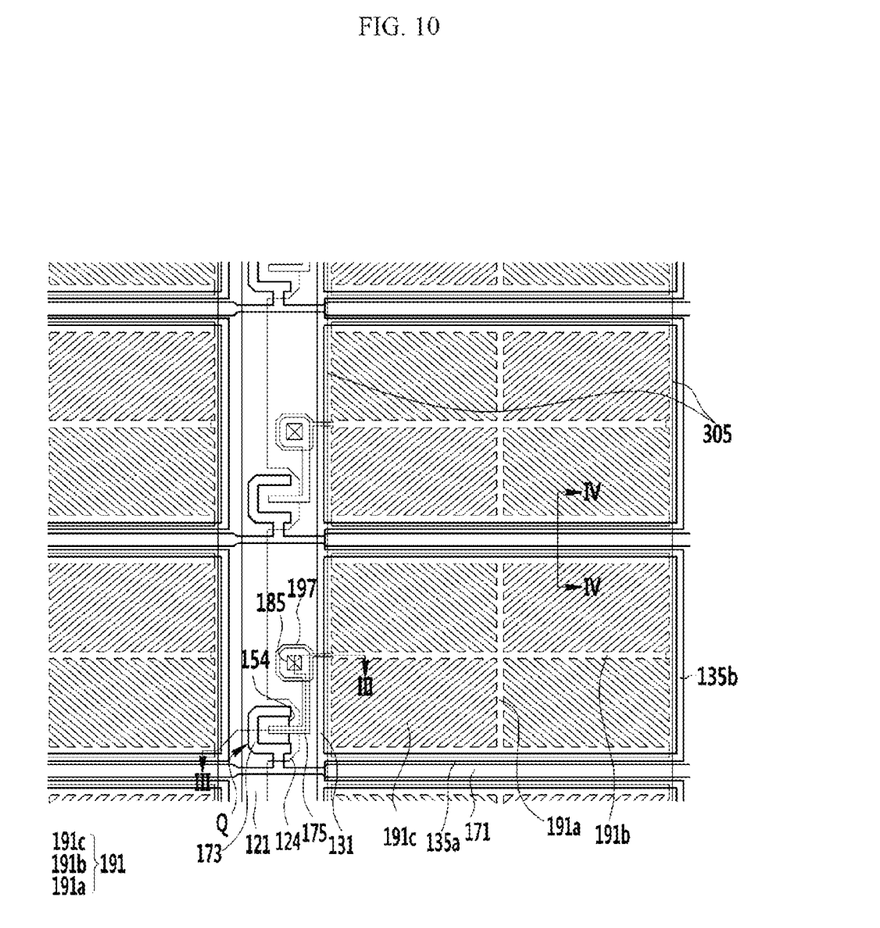
FIG. 10 is a top plan view illustrating a liquid crystal display formed by the method for manufacturing a liquid crystal display according to the exemplary embodiment of the present invention.
Figure 11:
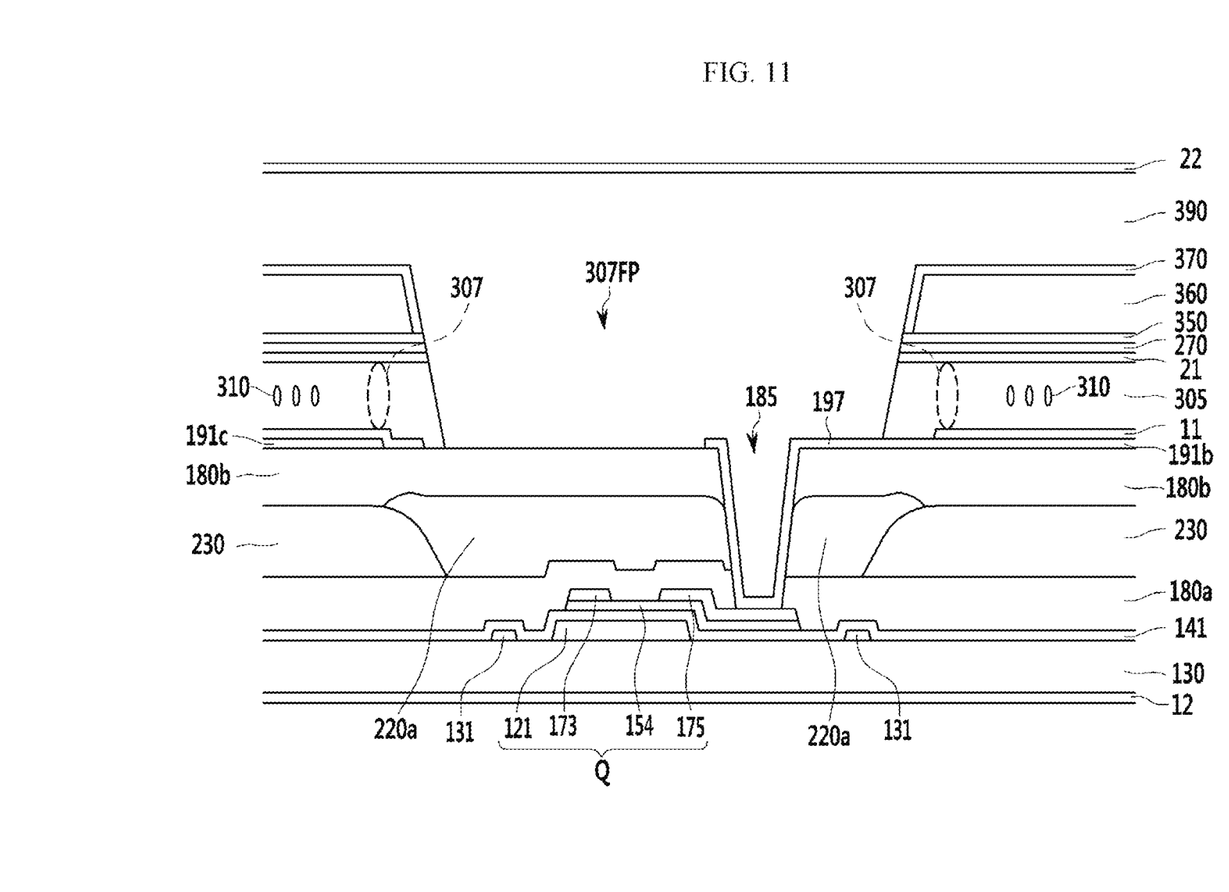
FIG. 11 is a cross-sectional view taken along cut line III-III of FIG. 10.
Figure 12:
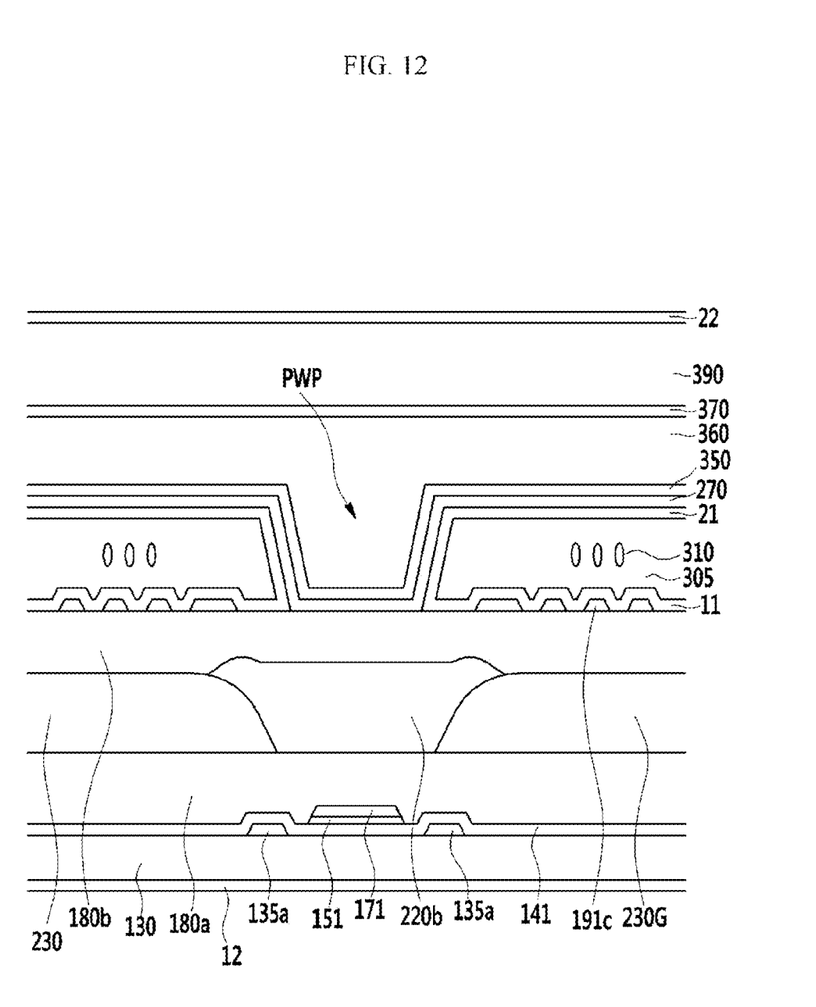
FIG. 12 is a cross-sectional view of the liquid crystal display taken along cut line IV-IV of FIG. 10.

FIGS. 10 to 12 are views illustrating a structure of the liquid crystal display according to the exemplary embodiment of the present invention. In detail, FIG. 10 is a top plan view illustrating one pixel of the display device according to the exemplary embodiment of the present invention, FIG. 11 is a cross-sectional view illustrating a portion of the display device according to the exemplary embodiment of the present invention, which is taken along line III-III of FIG. 10, and FIG. 12 is a cross-sectional view illustrating a portion of the display device according to the exemplary embodiment of the present invention, which is taken along line IV-IV of FIG. 10.

Referring to FIGS. 10 to 12, polarizing plates 12 and 22 are formed on upper and lower surfaces of the liquid crystal display. The polarizing plate may be formed of the lower polarizing plate 12 formed beneath the barrier layer 130 and the upper polarizing plate 22 formed on an encapsulation layer 390. The lower polarizing plate 12 may be attached onto a lower surface of the barrier layer 130, and the upper polarizing plate 22 may be attached onto the encapsulation layer 390, thereby forming the polarizing plate.

Although not illustrated in FIGS. 11 and 12, the upper and lower polarizing plates 12 and 22 may be formed to further include a phase compensation layer compensating for a phase difference Rth in a thickness direction and/or a phase compensation layer compensating for a front surface phase difference Ro.

The barrier layer 130 is formed on the lower polarizing plate 12. In the present exemplary embodiment, the barrier layer 130 may be designed in a structure for preventing penetration of moisture and oxygen that may cause degradation of an image characteristic of the liquid crystal display. For example, the organic material substrate may be formed in a laminate structure where the barrier layer 130 formed of an inorganic material layer of a monolayer or a multi-layer or an organic/inorganic complex multi-layer is formed on the lower polarizing plate 12. Although not illustrated in FIGS. 11 and 12, in order to protect the barrier layer 130, a coating layer (overcoat layer) formed of a transparent polymer layer or the like may be formed on the barrier layer. In detail, in the case where the barrier layer 130 is formed of an organic material layer, for example, a flash evaporation technology comprising coating the organic material under vacuum and curing the organic material may be used. In the case where the barrier layer is formed of an inorganic material layer, the barrier layer may be formed by depositing SiOx, SiNx, or the like using a technology such as a plasma enhanced chemical vapor deposition (PECVD) method, an atmospheric pressure CVD (APCVD) method, and a low pressure CVD (LPCVD) method. However, the barrier layer 130 may be omitted in the present exemplary embodiment.

A gate line 121 and a storage electrode line 131 are formed on the barrier layer 130. The gate line 121 includes a gate electrode 124. The storage electrode line 131 mainly extends in a horizontal direction and may transfer a predetermined voltage such as a common voltage Vcom. The storage electrode line 131 includes a pair of vertical portions 135a extending to be substantially perpendicular to the gate line 121, and a horizontal portion 135b connecting ends of the pair of vertical portions 135a to each other. The storage electrodes 135a and 135b may have a structure surrounding a pixel electrode 191.

A gate insulating layer 141 is formed on the gate line 121 and the storage electrode line 131. On the gate insulating layer 141, a linear semiconductor layer 151 positioned at a lower portion of a data line 171, and a semiconductor layer 154 at a portion corresponding to lower portions of source/drain electrodes and a channel region of a thin film transistor Q are formed. The linear semiconductor layer 151 and the semiconductor layer 154 corresponding to the lower portions of the source/drain electrodes and the channel region may be connected to each other.

Between the linear semiconductor layer 151 and the data line 171, and between the semiconductor layer 154 corresponding to the lower portions of the source/drain electrodes and the channel region and the source/drain electrodes, a plurality of ohmic contacts may be formed, but are omitted in the drawings.

Data conductors 171, 173, and 175 including a source electrode 173, the data line 171 connected to the source electrode 173, and a drain electrode 175 are formed on each of the semiconductor layers 151 and 154 and the gate insulating layer 141.

The gate electrode 124, the source electrode 173, and the drain electrode 175 form the thin film transistor Q together with the semiconductor layer 154, and a channel of the thin film transistor Q is formed at an exposed portion of the semiconductor layer between the source electrode 173 and the drain electrode 175.

A first interlayer insulating layer 180a is formed on the data conductors 171, 173, and 175 and the exposed portion of the semiconductor layer. The first interlayer insulating layer 180a may include an inorganic insulator such as silicon nitride (SiNx) and silicon oxide (SiOx) or an organic insulator.

A color filter 230 and a light blocking member 220 are formed on the first interlayer insulating layer 180a.

First, the light blocking member 220 has a lattice structure having an opening corresponding to a region displaying an image, and is formed of a material through which light does not penetrate. The color filter 230 is formed in the opening of the light blocking member 220. The light blocking member 220 includes a horizontal light blocking member 220a formed in a direction that is parallel to the gate line 121, and a vertical light blocking member 220b formed in a direction that is parallel to the data line 171.

The color filter 230 may display one of primary colors such as three primary colors of red, green, and blue colors. However, the color of the color filter 230 is not limited to the three primary colors of red, green and blue colors, and the color filter 230 may display one of cyan, magenta, yellow, and white-based colors. The color filter 230 may be formed of materials displaying different colors for each of adjacent pixels.

A second interlayer insulating layer 180b is formed on the color filter 230 and the light blocking member 220 to cover the color filter 230 and the light blocking member 220. The second interlayer insulating layer 180b may include an inorganic insulator such as silicon nitride (SiNx) and silicon oxide (SiOx) or an organic insulator. Unlike a feature illustrated in the cross-sectional view of FIG. 2, in the case where a step occurs due to a difference in thickness between the color filter 230 and the light blocking member 220, the second interlayer insulating layer 180b may include the organic insulator to reduce or remove the step.

A contact hole 185, through which the drain electrode 175 is exposed, may be formed in the color filter 230, the light blocking member 220, and the interlayer insulating layers 180a and 180b.

The pixel electrode 191 is formed on the second interlayer insulating layer 180b. The pixel electrode 191 may be made of a transparent conductive material such as indium tin oxide (ITO) or indium zinc oxide (IZO).

A whole shape of the pixel electrode 191 is a quadrangle, and the pixel electrode 191 includes a cross-shaped stem portion formed of a horizontal stem portion 191a and a vertical stem portion 191b crossing the horizontal stem portion 191a. Further, the pixel electrode 191 is divided into four sub-regions by the horizontal stem portion 191a and the vertical stem portion 191b, and each sub-region includes a plurality of fine branch portions 191c. Further, in the present exemplary embodiment, a border stem portion surrounding a border of the pixel electrode 191 may be further included.

The fine branch portion 191c of the pixel electrode 191 forms an angle of about 40° or 45° with the gate line 121 or the horizontal stem portion. Further, the fine branch portions of the two adjacent sub-regions may be orthogonal to each other. Further, a width of the fine branch portion may be gradually increased, or intervals between the fine branch portions 191c may be different from each other.

The pixel electrode 191 includes an extension portion 197 connected to a lower end of the vertical stem portion 191b and having an area that is wider than that of the vertical stem portion 191b. The extension portion 197 of the pixel electrode 191 is physically and electrically connected to the drain electrode 175 through the contact hole 185, and receives a data voltage from the drain electrode 175.

The description relating to the thin film transistor Q and the pixel electrode 191, which are described above, is an example, and a thin film transistor structure and a pixel electrode design may be modified in order to improve lateral surface visibility.

A lower alignment layer 11 is formed on the pixel electrode 191, and the lower alignment layer 11 may be a vertical alignment layer. The lower alignment layer 11 may be formed to include at least one of materials generally used as a liquid crystal alignment layer, such as polyamic acid, polysiloxane, or polyimide. Further, the lower alignment layer 11 may be a photo-alignment layer.

An upper alignment layer 21 is positioned at a portion facing the lower alignment layer 11, and a microcavity 305 is formed between the lower alignment layer 11 and the upper alignment layer 21. A liquid crystal material including a liquid crystal molecule 310 is injected into the microcavity 305, and the microcavity 305 has a liquid crystal injection hole 307. In the present exemplary embodiment, an alignment material forming the alignment layers 11 and 21 and a liquid crystal material including the liquid crystal molecule 310 may be injected into the microcavity 305 by using capillary force.

The microcavity 305 is divided in a vertical direction by a plurality of trenches 307FP positioned at a portion overlapping the gate line 121 to form a plurality of microcavities 305, and the plurality of microcavities 305 may be formed in a column direction of the pixel electrode 191, in other words, the vertical direction.

The trench 307FP may be elongated in an extension direction of the gate line 121. The plurality of trenches 307FP may vertically section the microcavity 305, and may be an empty space from which a common electrode 270, an insulating layer 350, and the like are removed. The trench 307FP may be covered with a capping layer 390, which will be described below, after the liquid crystal material including the alignment layers 11 and 21 and the liquid crystal molecules 310 are injected.

Further, the trench 307FP may be filled with the alignment material or the liquid crystal material to be a channel through which the alignment material or the liquid crystal material is injected into the microcavity 305 through a liquid crystal injection hole 307.

The common electrode 270 and the lower insulating layer 350 are disposed on the upper alignment layer 21. The common electrode 270 receives a common voltage and forms an electric field together with the pixel electrode 191 to which a data voltage is applied, thereby determining an inclination direction of a liquid crystal liquid crystal molecules 310 positioned in the microcavity 305 between the two electrodes. The common electrode 270 and the pixel electrode 191 form a capacitor to maintain the applied voltage even after the thin film transistor is turned off. The lower insulating layer 350 includes silicon nitride (SiNx) or silicon oxide ($SiO_2$).

The present exemplary embodiment describes that the common electrode 270 is formed on the microcavity 305, but as another exemplary embodiment, the common electrode 270 can be formed at a lower portion of the microcavity 305 to drive liquid crystal according to an in-plane switching mode.

The roof layer 360 is disposed on the lower insulating layer 350. The roof layer 360 serves to support the microcavity 305 so that the microcavity 305, which is a space between the pixel electrode 191 and the common electrode 270, is formed. The roof layer 360 may include a photoresist, or other organic materials.

An upper insulating layer 370 is disposed on the roof layer 360. The upper insulating layer 370 may come into contact with an upper surface of the roof layer 360. The upper insulating layer 370 includes silicon nitride (SiNx) or silicon oxide ($SiO_2$).

An encapsulation layer 390 is disposed on the upper insulating layer 370 and in the trench 307FP. The encapsulation layer 390 fills the trench 307FP to cover the liquid crystal injection hole 307 of the microcavity 305 exposed by the trench 307FP. The encapsulation layer 390 may include an organic material or an inorganic material.

As described above, the upper polarizing plate 22 is formed on the encapsulation layer 390.

Meanwhile, as illustrated in FIG. 12, a partition wall portion PWP is disposed between the microcavities 305 adjacent in a horizontal direction. The partition wall portion PWP may be formed in an extension direction of the data line 171, and may be covered by the roof layer 360. The lower insulating layer 350, the common electrode 270, the upper insulating layer 370, and the roof layer 360 are filled in the partition wall portion PWP, and this structure may form a partition wall to section or define the microcavity 305.

Referring to FIGS. 10 to 12, in the liquid crystal display according to the exemplary embodiment of the present invention, since the substrate is not formed at both the upper and lower portions thereof, there can be provided an ultrathin film liquid crystal display having flexibility while cost is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 12, 105: Lower polarizing plate | 22, 160: Upper polarizing plate |
| 110: Substrate | 115: Adhesive layer |
| 120: Polymer thin film layer | 130: Barrier layer |

<Description of symbols>

140: Thin film transistor substrate
150, 390: Encapsulation layer

What is claimed is:

1. A method for manufacturing a liquid crystal display, the method comprising:
    forming a polymer thin film layer on a substrate;
    forming a thin film transistor (TFT) substrate on the polymer thin film layer;
    forming a thin film transistor array on the thin film transistor substrate;
    forming an upper polarizing plate on the thin film transistor substrate on which the thin film transistor array is formed;
    applying a laser to the polymer thin film layer to remove at least a portion of the polymer thin film layer and the substrate;
    attaching an adhesive layer onto a rear surface of the polymer thin film layer from which the substrate is separated; and
    attaching the polymer thin film layer onto which the adhesive layer is attached and a lower polarizing plate together.

2. The method of claim 1, wherein:
    a thickness of the polymer thin film layer remaining after partial removal by the laser is 0.1 um to 1 um.

3. The method of claim 1, wherein:
    the polymer thin film layer includes opaque polyimide, polyamide, polycarbonate, or polyethylene terephthalate, or a combination thereof.

4. The method of claim 1, wherein:
    the laser having an energy density of 200 mJ/cm$^2$ to 300 mJ/cm$^2$ is radiated to remove the polymer thin film layer.

5. The method of claim 1, further comprising:
    forming a barrier layer between the polymer thin film layer and the thin film transistor substrate.

6. The method of claim 5, wherein:
    the barrier layer includes one or more of silicon nitride (SiNx), silicon oxide (SiOx), aluminum oxide ($Al_2O_3$), silicon oxynitride, aluminum nitride, and aluminum oxynitride.

7. The method of claim 6, wherein:
    the barrier layer is formed of a monolayer or a multi-layer.

8. The method of claim 5, further comprising:
    forming an encapsulation layer positioned between the thin film transistor substrate and the upper polarizing plate and covering an upper surface and an edge of the thin film transistor substrate.

9. The method of claim 8, wherein:
    the encapsulation layer is formed of a monolayer or a multi-layer.

10. The method of claim 5, wherein:
    a glass transition temperature Tg of the lower polarizing plate is lower than a glass transition temperature of the polymer thin film layer.

11. The method of claim 1, wherein:
    the laser is applied to the polymer thin film layer to completely remove the polymer thin film layer.

12. The method of claim 1, further comprising:
    forming a pixel electrode connected to one terminal of the thin film transistor;
    forming a sacrificial layer on the pixel electrode;
    forming a roof layer on the sacrificial layer;
    removing the sacrificial layer to form a plurality of microcavities; and
    injecting a liquid crystal material into the microcavity to form a liquid crystal layer.

* * * * *